(12) United States Patent
Fischer et al.

(10) Patent No.: US 8,145,816 B2
(45) Date of Patent: Mar. 27, 2012

(54) SYSTEM AND METHOD FOR DEADLOCK FREE BUS PROTECTION OF RESOURCES DURING SEARCH EXECUTION

(75) Inventors: Stephen A. Fischer, Gold River, CA (US); Douglas Raymond Moran, Folsom, CA (US); James A. Sutton, II, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1769 days.

(21) Appl. No.: 10/942,351

(22) Filed: Sep. 15, 2004

(65) Prior Publication Data

US 2006/0059285 A1 Mar. 16, 2006

(51) Int. Cl.
G06F 12/00 (2006.01)
G06F 12/14 (2006.01)
G06F 7/04 (2006.01)

(52) U.S. Cl. .......................................... 710/200; 726/2

(58) Field of Classification Search .................. 710/105, 710/107–108, 200, 260; 712/229; 713/100, 713/154, 189–190, 193; 726/2, 4, 11, 14, 726/16, 17, 21
See application file for complete search history.

(56) References Cited

U.S. PATENT DOCUMENTS

| 5,251,304 | A | * | 10/1993 | Sibigtroth et al. ............... 726/29 |
| 5,944,822 | A | | 8/1999 | Cornils et al. |
| 6,775,779 | B1 | * | 8/2004 | England et al. ................. 726/26 |
| 2002/0138677 | A1 | | 9/2002 | Brock et al. |
| 2003/0172214 | A1 | | 9/2003 | Moyer et al. |
| 2003/0191943 | A1 | | 10/2003 | Poisner et al. |
| 2003/0200451 | A1 | | 10/2003 | Evans et al. |
| 2004/0003297 | A1 | * | 1/2004 | Ma ................................. 713/300 |
| 2004/0210760 | A1 | * | 10/2004 | McGrath et al. ............... 713/190 |
| 2004/0210764 | A1 | * | 10/2004 | McGrath et al. ............... 713/200 |
| 2004/0260910 | A1 | * | 12/2004 | Watt et al. ........................ 712/43 |

FOREIGN PATENT DOCUMENTS

EP 1209563 A2 * 5/2002
WO WO 03/090052 10/2003

OTHER PUBLICATIONS

"Intel Architecture Software Developer's Manual". vol. 3: System Programming. Intel Corporation. 1999. Order No. 243192. pp. 12-1-12-17.*
"System Memory". The PC Guide. Version 2.2.0. Kozierok, Charles M. Online Apr. 17, 2001. Retrieved from Internet Feb. 14, 2007. <http://www.pcguide.com/ref/ram/inidex-c.html>.*
Intel Corporation, Office Action dated Feb. 23, 2010 for Japanese Patent Application No. 2007-531318.
Intel Corporation, Office Action dated Jul. 3, 2009 (for Chinese Patent Application No. 200580031112.2).
Intel Corporation, Office Action dated Jan. 19, 2010 for Japanese Patent Application No. 2007-531318.

(Continued)

Primary Examiner — Thomas J Cleary
(74) Attorney, Agent, or Firm — Blakely, Sokoloff, Taylor & Zafman LLP

(57) ABSTRACT

A method and system of deadlock free bus protection of memory and I/O resources during secure execution. A bus cycle initiates entry of a bus agent into a secure execution mode. The chipset records an identifier of the secure mode processor. Thereafter, the chipset intercedes if another bus agent attempts a security sensitive bus cycle before the secure mode processor exits the secure mode.

16 Claims, 3 Drawing Sheets

OTHER PUBLICATIONS

Intel Corporation, Office Action dated Mar. 28, 2008 (for Chinese Patent Application No. 200580031112.2).

Intel Corporation, Office Action dated Oct. 10, 2008 (for Chinese Patent Application No. 200580031112.2).

Intel Corporation, Office Action dated Oct. 25, 2010 (for Chinese (Divisional) Patent application No. 201010162183.9).

Intel Corporation, Office Action dated May 11, 2010 for Japanese Patent Application No. 2007-531318.

Intel Corporation, Questioning and Report on Reconsideration by Examiner Before Appeal mailed Apr. 26, 2011 for Japanese Patent Application No. 2007-531318.

* cited by examiner

SYSTEM AND METHOD FOR DEADLOCK FREE BUS PROTECTION OF RESOURCES DURING SEARCH EXECUTION

BACKGROUND

1. Field of the Invention

Embodiments of the invention relate to secure execution environments. More particularly, embodiments of the invention relate to avoiding deadlock conditions in multi-processor systems having at least one processor executing in a secure execution mode.

2. Background

Multiple processor systems are ubiquitous in today's information driven society. In some cases, it is desirable to permit one processor in the system to process security sensitive information while restricting access to that information by other processors in the system. To that end, various secure environments have been established to authenticate a potential accessor of secure data and to prevent other agents from accessing that data while exposed in a shared memory or other shared resource. In some cases, the arbitrator on the shared bus is prevented from granting the bus to any processor not executing in the secure mode. Unfortunately, some global operations, such as a stop clock operation, require an acknowledgement from all processors to indicate they are prepared for the stop clock operation to occur. When the arbitrator is holding all bus agents off the bus except for the processor in a secured mode, the remaining bus agents are unable to acknowledge the stop clock request and therefore, the stop clock operation never occurs. This results in significant power inefficiency, and/or deadlock conditions.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
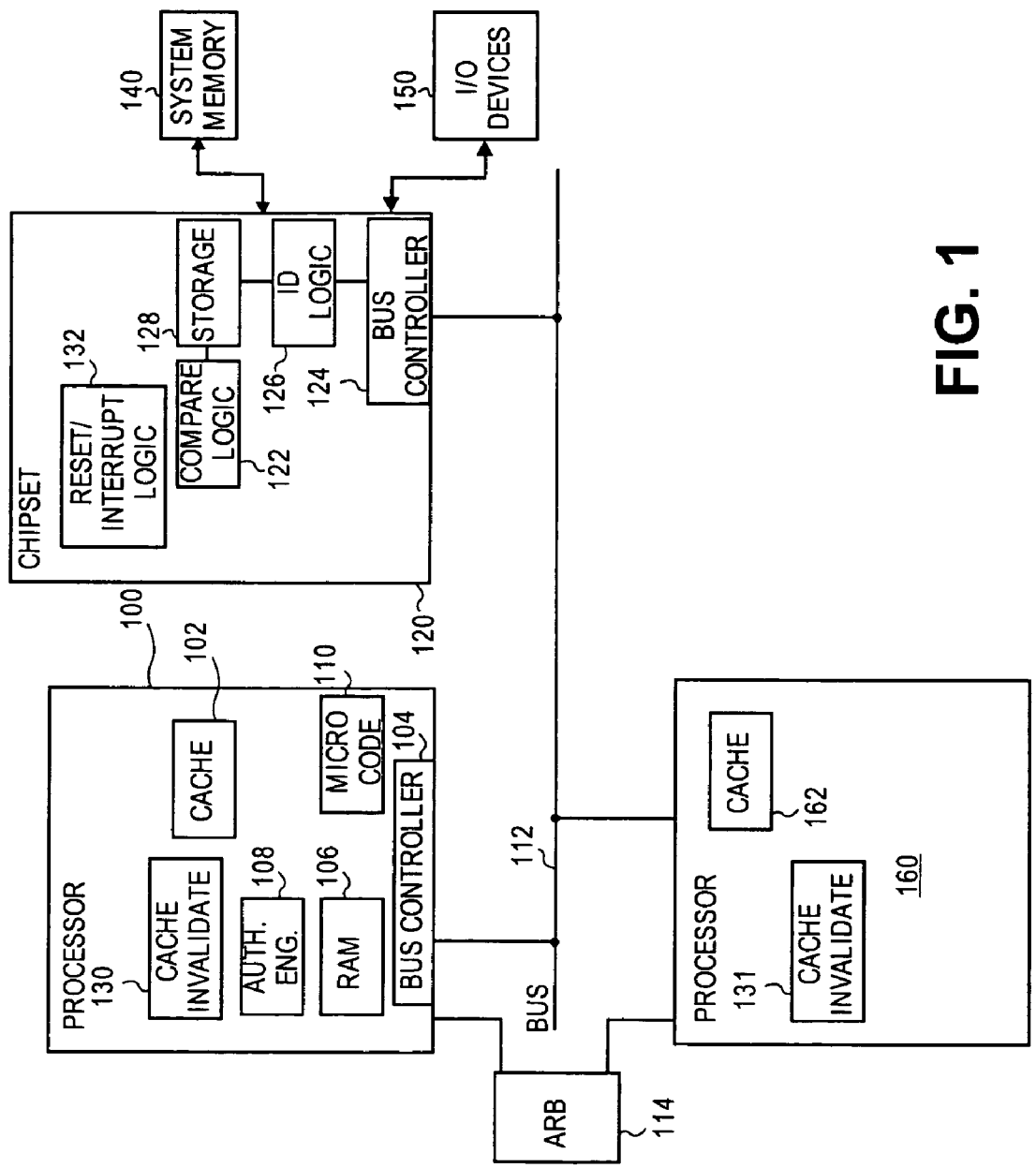
FIG. 1 is a block diagram of a system of one embodiment of the invention.

FIG. 1 is a block diagram of a system of one embodiment of the invention. A first bus agent, such as processor 100, is coupled to a bus 112. Bus 112 is shared with one or more additional bus agents, such as processor 160. The number of bus agents may be arbitrarily large and restrained by physical and electrical limitations of the bus 112. An arbitration unit 114 arbitrates access to bus 112 between the various bus agents, such as processor 100 and processor 160. In some embodiments, separate physical buses may exist, but are logically arbitrated as a single bus. A chipset 120 resides on bus 112. Chipset 120 provides an interface between the bus agents sharing bus 112 and system memory 140 and input/output (I/O) devices 150. In one embodiment, each processor may have a dedicated bus and interface with the chipset 120 for access to system resources such as, system memory 140 and I/O devices 150.

Each processor 100, 160 includes a cache 102 and 162 respectfully. Coherency of the cache in the multi-processor system may be performed in any conventional manner, including write back, write through or any other manner which cache coherency is traditionally maintained in a multi-processor system. Processor 100 includes microcode 110 to permit the processor to enter and exit a secure execution mode by issuing appropriate bus cycles. An authentication engine 108, it is provided to allow processor 100 to authenticate code received from an external source to ensure the code should be trusted. In one embodiment, authentication engine 108 may perform the authentication on a code module by hashing the code and comparing the hash value with a digitally signed hash value decrypted using the public key of a public private key pair. In an alternative embodiment, authentication may be performed by the microcode 110. Once the code successfully authenticates, the processor 100 may broadcast a bus cycle to request entry into a secure mode. Once in the secure mode, processor 100 may operate in the secure mode until it issues a bus cycle to release the secure mode.

In one embodiment, microcode 110 uses a bus controller 104 as a liaison with the bus 112 to generate a bus cycle to enter the secure execution mode. In secure execution mode, the processor 100 executes authenticated code out of an internal random access memory (RAM) 106. Because RAM 106 is internal data and code continued therein is generally inaccessible to access by outside agents, but that code may use security sensitive data from system memory 140 or perform security sensitive I/O operations involving data to which other bus agents should not be granted access. Accordingly, while the processor 100 is operating in the secure mode, it is important that processor 160 not be permitted to execute security sensitive bus cycles on bus 112. However, as noted above, restricting processor 160 from accessing the bus by denying it a right to arbitrate at arbitrator 114 may lead to deadlock conditions.

Accordingly, when bus controller 104 issues a signal that constitutes a request to enter a secure mode, bus controller 124 in chipset 120 receives that cycle and identification logic 126 extracts an identifier for processor 100, which uniquely identifies it as compared to other bus agents in the system. The identifier is recorded in a storage unit 128 for use in comparison with subsequent bus cycles. In another embodiment, all processors perform a cache invalidation handshake as a prerequisite to a processor entering the secure mode. Cache invalidation logic 130, 131 present in processor 100 and 160 respectively performs the cache invalidation. This eliminates the need for write back during a secure execution mode. In an alternative embodiment, cache invalidation does not occur, but writes from an insecure bus agent in response to a snoop cycle are not deemed "security sensitive" cycles.

While processor 100 is operating in the secure execution mode, chipset 120 watches bus 112 for security sensitive cycles. If a security sensitive cycle is identified the chipset uses compare logic 122 to compare the identifier of the originating bus agent with the identifier recorded in storage unit 128. If the identifiers match, e.g., the originator of the security sensitive bus cycle, is the bus agent operating in secure mode, the transaction is allowed to complete. However, if the identifiers do not match, for example processor 160 attempts to read from or write to the system memory 140 while processor 100 is executing in secure execution mode, the chipset 120 will intercede and will either attempt to prevent that transaction from completing or prevent further transactions by the non secure bus agent. To facilitate the intercession, chipset 120 may include reset/interrupt logic 132. In one embodiment, the chipset 120 intercedes by asserting a system reset in response to a security sensitive bus cycle issued by an insecure bus agent. In another embodiment, the chipset 120 asserts a high priority interrupt to the bus agent, e.g., processor 100 executing in secure mode. In an embodiment in which each processor has a dedicated bus, but shares certain system resources, only accesses of the shared resources such as, system memory 140 or I/O devices 150 may be deemed security sensitive. Stated differently, a processor may be free to use its dedicated resources without intervention by the chipset even when another bus agent is in a secure mode.

In some cases, the chipset 120 may wish to perform a global action. For example, in the context of power management, the chipset is often tasked with asserting a stop clock action. However, before that global action can occur, each of the agents on the bus, e.g., processor 100 and processor 160, must acknowledge that they are in a state where, e.g., their clock can be stopped. Because the stop clock acknowledge is not deemed a security sensitive transaction, it is allowed to complete from all agents on the bus even when one agent is operating in secure execution mode. In this manner, power management and other housekeeping chores may effectively be accomplished without jeopardizing the security of the secure execution mode.

In some embodiments, other bus agents such as, direct memory access (DMA) controllers, network cards, and other I/O bus masters may attempt security sensitive transactions. In one embodiment, prevention of a security breach by such devices is left to the processor controlling them. In another embodiment, the chipset treats such bus agents as it would a processor bus agent, e.g., intervening if such an agent asserts a security sensitive cycle while another agent is in secure mode.

Figure 2:
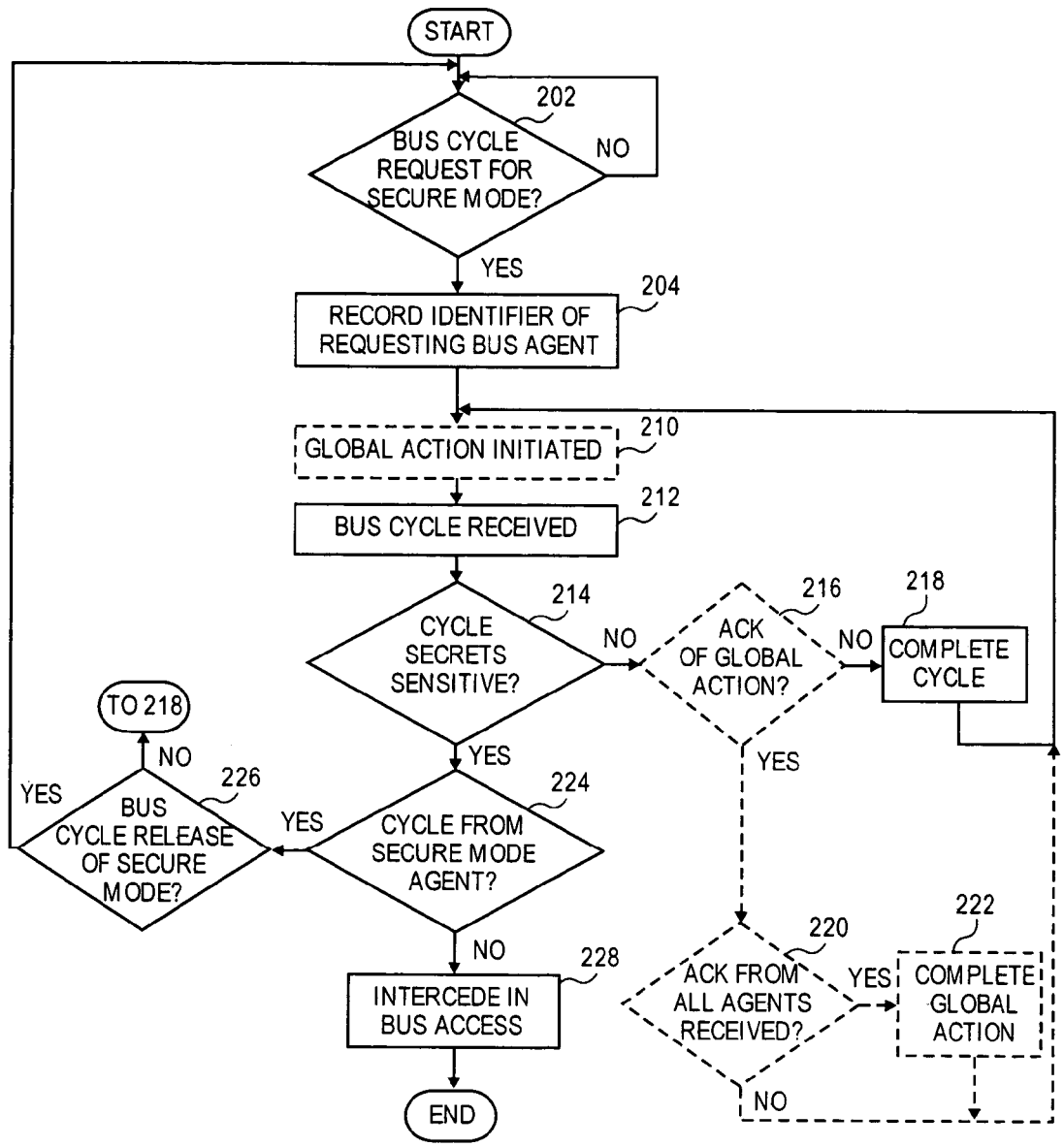
FIG. 2 is a flow diagram of operation in a chipset of one embodiment of the invention.

FIG. 2 is a flow diagram of operation in a chipset of one embodiment of the invention. At decision block 202, a determination is made if a bus cycle constitutes a request for entry into a secure mode. If it is not, the chipset watches for additional bus cycles, allowing them to complete in the normal course until a bus cycle that is a request for a secure mode is received. When a bus cycle that is a request for a secure mode is received, the chipset records the identifier of the requesting bus agent at block 204.

Block 210 is depicted in phantom lines to reflect that the chipset may initiate a global action, but need not do so in each iteration through the flow diagram. Such global actions include, for example, assertion of a stop clock condition or interrupt controller message cycles requiring a response.

At block 212, the chipset receives a bus cycle. At decision block 214, the chipset determines the cycle is considered security sensitive. For example, in one embodiment, all read and write cycles to system memory or I/O devices are deemed security sensitive. Additionally, various control cycles may be deemed security sensitive. Conversely, interrupt acknowledgements and global action acknowledgements, for example, are deemed security insensitive. For example, a second request to enter a secure mode (when another processor is already executing in secure mode) may be treated as an attack. If the cycle is not security sensitive, a determination is made at decision block 216, if the cycle acknowledges a pending global action. If not, the cycle is allowed to complete at block 218. If it is, a determination is made at decision block 220 if acknowledges have been received from all agents. If all agents have acknowledged, the chipset completes the global action at block 222.

If at decision block 214 a determination is made that the cycle is security sensitive, a determination is made at 224 if the cycle is from a secure agent. If the cycle is from the secure agent, the determination is made at decision block 226 if the bus cycle is a release of the secure mode. If it is not, the bus cycle is allowed to complete it at block 218. If it is, no agent in the system is then currently in secure mode. If at decision block 224 the cycle is determined not to be from an agent in secure mode, the chipset intercedes in the bus access at 228. In various embodiments, this intercession may take the form of asserting a high priority interrupt to the bus agent operating in secure mode or may take the form of assertion of a system reset to reset the entire system.

Figure 3:
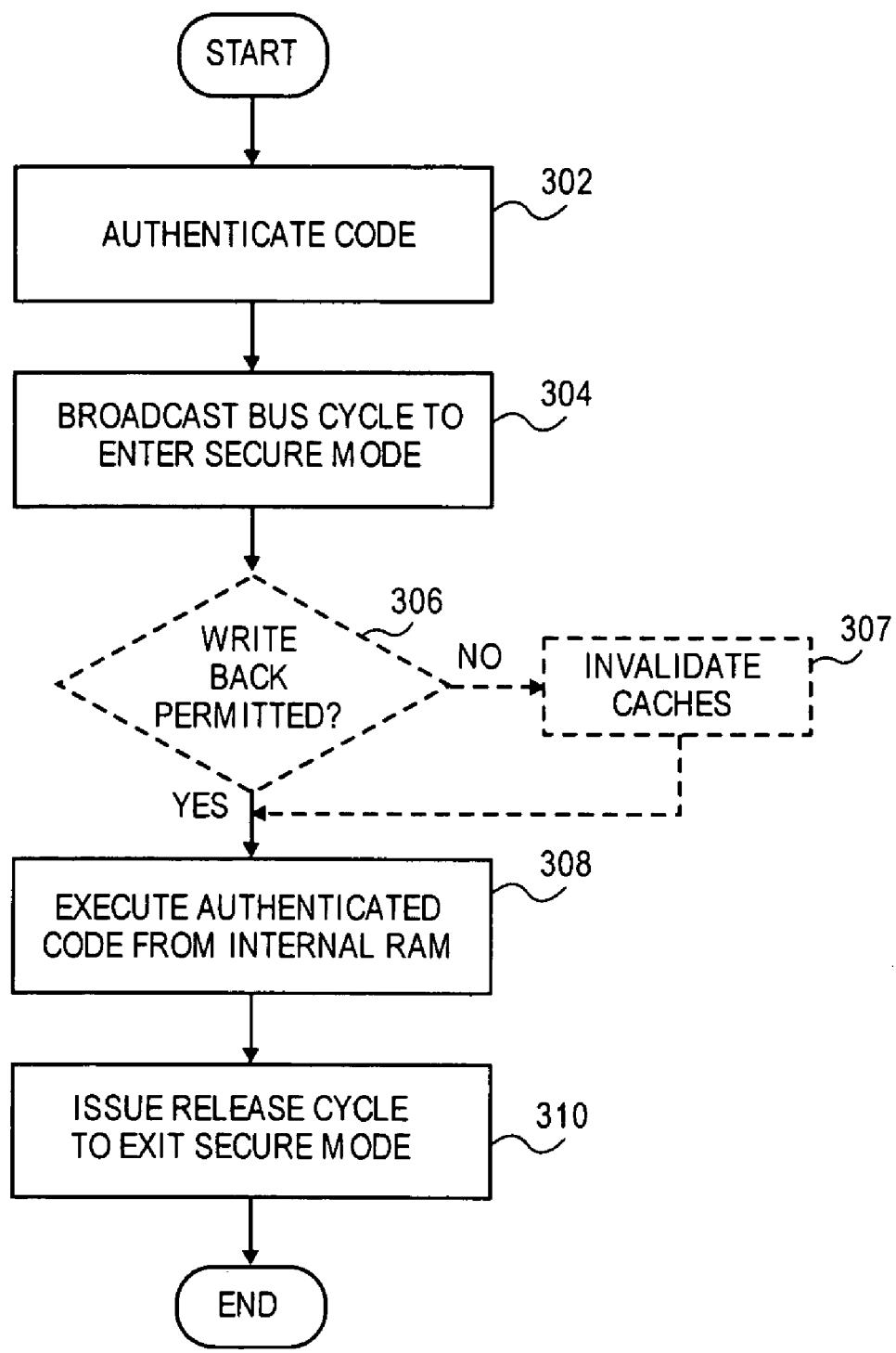
FIG. 3 is a flow diagram of operation in a processor in one embodiment of the invention.

FIG. 3 is a flow diagram of operation in a processor in one embodiment of the invention. At block 302, the processor authenticates a block of code. At block 304, the processor broadcasts the bus cycle requesting entry into secure mode. Decision block 306 represents an implicit decision made at design time where the determination is made whether write back for cache coherency will be permitted during secure execution mode. In an alternative embodiment, the authenticated code may provide a basis for making the decision at decision block 306. For example, the authentication code may set a register in the processor to indicate whether write backs are permitted. If write backs are not permitted, all caching bus agents need to invalidate the caches at block 307 to ensure cache coherency during the secure execution. Cache invalidation may be performed using various handshaking techniques that effectively requires the most current information in the caches to be written back to system memory as a prerequisite to entering the secure mode. At block 308, the processor executes the authenticated code from an internal random access memory (RAM). The processor may remain in the secure mode for an indefinite period of time. In one embodiment, the chipset maintains its secure vigilance until the secure processor issues a release cycle on the bus to exit secure execution mode. When the processor is finished with its secure execution, it issues a release cycle to exit the secure mode at block 310.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   identifying a bus cycle from a first bus agent as a request to enter a secure execution mode;
   recording an identifier of the first bus agent;
   interceding if another bus agent initiates a security sensitive bus cycle directed to a shared system memory or an input/output device.

2. The method of claim 1 wherein interceding comprises one of:
   sending an interrupt to the first bus agent; and
   initiating a system reset.

3. The method of claim 1 wherein interceding comprises:
   preventing completion of the security sensitive bus cycle.

4. The method of claim 1 wherein interceding comprises:
   preventing a subsequent transaction initiated by the other bus agent.

5. The method of claim 1 further comprising:
   permitting security insensitive bus cycles from any bus agent.

6. The method of claim 1 further comprising:
   initiating a global action on the bus;
   accepting an acknowledgement of the global action over the bus from each bus agent while the first bus agent is in a secure mode; and
   completing the global action.

7. The method of claim 1 wherein all read and write cycles directed to system memory and input/output devices other than write back cycles are deemed security sensitive cycles.

8. The method of claim 1 further comprising:
   receiving a bus cycle from the first bus agent indicating release of the secure execution mode;
   discontinuing the interceding responsive to the release.

9. A system comprising:
   a bus;
   a first bus agent coupled to the bus, the first having logic to permit entry into a secure execution mode;
   a second bus agent coupled to the bus; and
   a chipset coupled to the bus to identify a bus cycle from the first bus agent to initiate the secure execution mode, the chipset to record an identifier of the first bus agent and to restrict security sensitive bus cycles directed to a shared system memory or an input/output device from the second bus agent until the first bus agent exits the secure execution mode.

10. The system of claim 9 wherein the first bus agent comprises:
    an internal random access memory;
    an authentication engine;
    a microcode to generate a first bus cycle to enter a second bus cycle to exit the secure execution mode; and
    a bus controller to initiate the first and second bus cycles.

11. The system of claim 9 wherein the chipset comprises:
    a bus controller to accept bus cycles from the first and second bus agents;
    logic to identify a cycle requesting entry into the secure execution mode;
    a storage element to retain an identifier of a source of the cycle; and
    logic to compare the identifier with an identifier for a source of subsequent security sensitive cycles.

12. The system of claim 9 wherein the first bus agent and the second bus agent each include cache invalidation logic to invalidate a local cache responsive to an attempt to enter the secure execution mode.

13. The system of claim 9 wherein the second bus agent is one of:
    a direct memory access controller, a network processor, a general purpose processor, and an input/output bus master.

14. An apparatus comprising:
    a bus controller to identify a bus cycle requesting entry into a secure execution mode;
    a storage unit to record an identifier of a source of the bus cycle; and
    comparison logic to identify if a security sensitive bus cycle directed to a shared system memory or an input/output device originates from the source.

15. The apparatus of claim 14 further comprising:
    reset logic to force a system reset responsive to the comparison logic identifying the security sensitive bus cycle does not originate from the source.

16. The apparatus of claim 14 further comprising:
    an interrupt generator to generate an interrupt directed to the source of the bus cycle responsive to the security sensitive bus cycle if the security sensitive bus cycle originates from a different source.

\* \* \* \* \*